United States Patent [19]
Krishnan

[11] Patent Number: 5,830,934
[45] Date of Patent: Nov. 3, 1998

[54] COLLOIDALLY STABILIZED EMULSION POLYMER

[75] Inventor: Venkataram Krishnan, Cary, N.C.

[73] Assignee: Reichhold Chemicals, Inc., Durham, N.C.

[21] Appl. No.: 565,209

[22] Filed: Oct. 27, 1995

[51] Int. Cl.⁶ .............................. C08L 1/26; C08K 5/24; C08G 77/04

[52] U.S. Cl. .............................. 524/43; 524/44; 524/45; 524/47; 524/55; 524/262; 524/503; 524/547; 525/57; 528/25; 528/26; 528/28; 528/32; 528/41

[58] Field of Search .................... 524/262, 503, 524/547, 43, 44, 45, 47, 55; 525/57; 528/25, 26, 28, 32, 41

[56] References Cited

U.S. PATENT DOCUMENTS

| | | | |
|---|---|---|---|
| 4,179,537 | 12/1979 | Rykowski | 427/387 |
| 4,287,329 | 9/1981 | Heimberg | 526/202 |
| 4,339,552 | 7/1982 | Lindemann | 524/459 |
| 4,397,968 | 8/1983 | Eck et al. | 523/305 |
| 4,528,315 | 7/1985 | Eck et al. | 524/458 |
| 4,937,284 | 6/1990 | Bergström | 525/57 |
| 5,001,011 | 3/1991 | Plueddemann | 428/447 |
| 5,006,573 | 4/1991 | Plueddemann | 523/214 |
| 5,100,948 | 3/1992 | Aydin et al. | 524/262 |
| 5,141,983 | 8/1992 | Hasegawa et al. | 524/457 |
| 5,155,193 | 10/1992 | Georges et al. | 526/230.5 |
| 5,300,555 | 4/1994 | Weih et al. | 524/571 |
| 5,308,910 | 5/1994 | Yuki et al. | 524/503 |
| 5,352,720 | 10/1994 | Aydin et al. | 524/162 |
| 5,354,803 | 10/1994 | Dranger et al. | 524/503 |
| 5,385,973 | 1/1995 | Marciandi et al. | 524/730 |
| 5,434,216 | 7/1995 | Mudge et al. | 524/803 |

FOREIGN PATENT DOCUMENTS

| | | |
|---|---|---|
| 2182202 | 1/1995 | Canada . |
| 2182202 | 3/1995 | Canada ............ C02T 43/04 |
| 0 516 360 A1 | 12/1992 | European Pat. Off. . |
| 0640629 A1 | 1/1995 | European Pat. Off. ...... C08F 246/00 |
| 0 640 629 A1 | 3/1995 | European Pat. Off. . |
| 4402408 A1 | 3/1995 | Germany ............ C08J 3/12 |
| 44 02 408 A | 8/1995 | Germany . |
| 2028 203 A | 7/1988 | Japan . |
| 2 196880 | 1/1989 | Japan . |
| 05059106 A | 3/1993 | Japan . |
| 06128443 A | 5/1994 | Japan . |
| 6179705 | 6/1994 | Japan . |
| 07070989 A | 3/1995 | Japan . |
| 2 099 000 A | 4/1981 | United Kingdom . |
| WO 94/22671 | 10/1994 | WIPO . |
| WO 95/20626 | 3/1995 | WIPO ............ C08K 5/54 |

OTHER PUBLICATIONS

PCT International Search Report on PCT/US96/16167.
Ken Yuki et al; The Role of Polyvinyl Alcohol in Emulsion Polymerization; *Polymer Internatoinal;* 30, No. 4; pp. 513–517 (1993).

*Primary Examiner*—Kriellion S. Morgan
*Attorney, Agent, or Firm*—Myers Bigel Sibley & Sajovec, P.A.

[57] ABSTRACT

An emulsion polymer is disclosed by the present invention. In particular, the emulsion polymer comprises a protective colloid and a functionalized silane component which is of the formula:

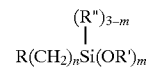

wherein R" is $C_1$–$C_5$ alkyl, R' is $C_1$–$C_5$ alkyl, R is SH, $CH_2$=CH—, $CH_2$=C($CH_3$)—C(O)O—, $CH_2$=CH—C(O)O—, and

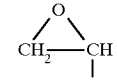

n is 1–10, and m is 2 or 3.

33 Claims, No Drawings

COLLOIDALLY STABILIZED EMULSION POLYMER

FIELD AND BACKGROUND OF THE INVENTION

The present invention relates to emulsion polymers, and more specifically, emulsion polymers stabilized by a protective colloid.

Emulsion polymers are typically stabilized by surfactants or by a combination of surfactants and protective colloids e.g., polyinylalcohol or hydroxyethylcellulose (HEC). The use of such colloids has traditionally been restricted to the polymerization of highly reactive, hydrophilic monomers such as vinylacetate, e.g., polyvinylacetate, vinylacetate-ethylene (VAE) copolymers and vinylacrylics. Examples of the use of colloids in the emulsion polymerization of hydrophobic monomers such as styrene, butadiene are very rare and this probably is due to the extreme difficulty of getting stable emulsions in these systems. Latices stabilized by polyvinylalcohol or HEC have a unique rheology and tack properties compared to surfactant stabilized systems that make it attractive in application areas such as coatings and adhesives. Hence the interest in stabilizing other polymers using polymeric colloids is extremely high.

While numerous patents exist illustrating the use of polyvinylalcohol or other colloids in vinylacetate based polymers, it is just recently that two patents have issued that outline ways to make a polyvinyl alcohol stabilized butadiene copolymer emulsion. The first method, described in Japanese Patent 06179705 to Kuraray involves a two-step process in which the first step is to make a polyvinylalcohol end functionalized with a thiol (—SH) group. This is then used to stabilize butadiene-styrene emulsion in a subsequent step. The thiol functionalized polyvinylalcohol is made by polymerizing vinylacetate in the presence of, for example thiolactic or thioacetic acid and then hydrolyzing the resulting polymer.

The second patent, EP 0516360 to Lord Corporation proposes a butadiene polymer latex prepared by emulsion polymerizing butadiene with various monomers in the presence of polyvinylalcohol and a cosolvent such as methanol to facilitate the stabilization process. The methanol is subsequently removed from the latex by a stripping process.

The first process has the disadvantage that it involves two steps and that a separate functionalization step is required to make the polyvinylalcohol suitable for stabilizing a butadiene latex. The second process does not work without the cosolvent and hence the potential problems of solvent handling, recovery and recycling issues become a major cost and manufacturing concern.

The current invention avoids both of these problems and presents a simple one-step approach to preparing polyvinylalcohol stabilized butadiene copolymers using conventional emulsion polymerization equipment. The advantages of the present invention relate to the use of a functional silane that facilitates the grafting/adsorption of the polyvinylalcohol onto the butadiene emulsion copolymer. Yet another advantage of the present invention is that the polymer emulsions produced can be stabilized exclusively by fully hydrolyzed polyvinylalcohol. Commercially available medium molecular weight, fully hydrolyzed polyvinylalcohols (such as ELVANOL®) can be used without stability problems. This is difficult to achieve even with polyvinylacetate and vinylacetate-ethylene copolymer emulsions because of the generally accepted observation that fully hydrolyzed polyvinylalcohol does not adsorb favorably on vinylacetate copolymer emulsion particles and is certainly unheard of in butadiene emulsion copolymers.

SUMMARY OF THE INVENTION

The present invention provides emulsion polymers containing an aliphatic conjugated diene monomer which is stabilized by a protective colloid (e.g., polyvinyl alcohol) and a functionalized silane component which is capable of being incorporated into the polymer and capable of adsorbing the protective colloid to provide stabilization to the polymer. An exemplary silane component is of the formula:

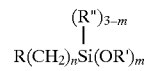

wherein R" is $C_1$–$C_5$ alkyl, R' is $C_1$–$C_5$ alkyl, R is SH, $CH_2$=CH—, $CH_2$=C($CH_3$)—C(O)O—, $CH_2$=CH—C(O)O—, and

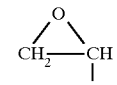

n is 1–10, and m is 2 or 3.

In one embodiment, the present invention provides a stabilized emulsion polymer comprising a copolymer of an aliphatic conjugated diene and a non-aromatic mono- or dicarboxylic ester monomer. In another embodiment, the stabilized emulsion polymer comprises a copolymer of an aliphatic conjugated diene and an aromatic unsaturated monomer. The stabilized emulsion polymer may also comprise a copolymer of an aliphatic conjugated diene and a nitrile monomer. In addition, a non-aromatic unsaturated mono- or dicarboxylic acid monomer can be incorporated into any of the above copolymers.

In accordance with the invention, the preferred functionalized silane component employed in the invention is gamma mercaptopropyl trimethoxy silane in which R is SH, R' is $C_1$-alkyl, n is 3, and m is 3.

The protective colloid may be selected from the group consisting of polyvinyl alcohols, hydroxymethyl cellulose, hydroxyethyl cellulose, starch and starch derivatives, gum tragacanth, gum arabic, polyacrylic acid/acrylates, carboxymethyl cellulose, poly(vinylalcohol)co(vinyl amine) copolymers, and dextrins. Preferably, the protective colloid is a polyvinyl alcohol.

DETAILED DESCRIPTION OF THE PREFERRED EMBODIMENT

As summarized above, the present invention relates to an emulsion polymer containing an aliphatic conjugated diene monomer which is stabilized by a protective colloid and a silane component capable of being incorporated into the polymer and capable of adsorbing the protective colloid to provide stabilization to the polymer. In particular, the emulsion polymer can be formed from various monomers and can be stabilized using the present invention. Particularly suitable is the copolymerization of aliphatic conjugated dienes copolymerized with non-aromatic unsaturated mono- or dicarboxylic ester monomers or aromatic unsaturated monomers, or nitrile monomers.

Suitable aliphatic conjugated dienes are $C_4$ to $C_9$ dienes and include, for example, butadiene monomers such as 1,3-butadiene, 2-methyl-1,3-butadiene, 2 chloro-1,3- butadiene, and the like. Blends or copolymers of the diene monomers can also be used. The aliphatic conjugated diene is used in an amount, based on total weight of the starting monomers, from about to 1 to 99 percent by weight, preferably from about 10 to 70 percent by weight, and most preferably from about to 20 to 50 percent by weight. A particularly preferred aliphatic conjugated diene is 1,3-butadiene.

Suitable non-aromatic unsaturated monocarboxylic ester monomers include acrylates and methacrylates. The acrylates and methacrylates may include functional groups such as amino groups, hydroxy groups, epoxy groups and the like. Exemplary acrylates and methacrylates include methyl acrylate, methyl methacrylate, ethyl acrylate, ethyl methacrylate, butyl acrylate, butyl methacrylate, 2-ethylhexyl acrylate, glycidyl acrylate, glycidyl methacrylate, hydroxyethyl acrylate, hydroxyethyl methacrylate, hydroxypropyl acrylate, hydroxypropyl methacrylate, isobutyl methacrylate, hydroxybutyl acrylate, hydroxybutyl methacrylate, 3-chloro-2-hydroxybutyl methacrylate, n-propyl methacrylate and the like. Exemplary amino-functional methacrylates include t-butylamino ethyl methacrylate and dimethylamino ethyl methacrylate. Suitable non-aromatic dicarboxylic ester monomers are alkyl and dialkyl fumarates, itaconates and maleates, with the alkyl group having one to eight carbons, with or without functional groups. Specific monomers include diethyl and dimethyl fumarates, itaconates and maleates. Other suitable non-aromatic dicarboxylic ester monomers include di(ethylene glycol) maleate, di(ethylene glycol) itaconate, bis(2-hydroxyethyl) maleate, 2-hydroxyethyl methyl fumarate, and the like.

The non-aromatic unsaturated mono- or dicarboxylic ester monomer is used in an amount, based on total weight of the starting monomers, preferably from about 1 to 99 percent by weight, and most preferably from about 50 to 80 percent by weight. A particularly preferred non-aromatic unsaturated monocarboxylic ester monomer is methyl methacrylate.

Suitable monomers based on the half ester of the unsaturated dicarboxylic acid monomer include mono esters of maleic acid or fumaric acid having the formula ROOC—CH=CH—COOH wherein R is a $C_1$ to $C_{12}$ alkyl group, for example monomethyl maleate, monobutyl maleate and monooctyl maleate. Half esters of itaconic acid having $C_1$ to $C_{12}$ alkyl groups such as monomethyl itaconate can also be used. Blends or copolymers of the unsaturated mono- or dicarboxylic acid monomers and of the half ester of the unsaturated dicarboxylic acid can also be used.

The unsaturated mono- or dicarboxylic acid or monomer based on the half ester of the unsaturated dicarboxylic acid is used in an amount, based on the total weight of the starting monomers, from about 0 to 20 percent by weight, preferably from about 0 to 10 percent by weight, and most preferably from about 0 to 5 percent by weight.

Suitable aromatic unsaturated monomers may be employed and include styrene and styrene derivatives such as alphamethylstyrene, p-methyl styrene, divinyl benzene, vinyltoluene, divinyl toluene, ethylstyrene, tert-butyl styrene, monochlorostyrene, dichlorostyrene, vinyl benzyl chloride, fluorostyrene, alkoxystyrenes (e.g., paramethoxystyrene) and the like.

Unsaturated mono- or dicarboxylic acid monomers and derivatives thereof may also be employed and include acrylic acid, methacrylic acid, itaconic acid, fumaric acid, and maleic acid.

Unsaturated nitrogen-containing monomers may also be employed such as acrylonitrile, methacrylonitrile, acrylamide, methacrylamide, N-methylolacrylamide, alkylated N-methylolacrylamides such as N-methoxymethylacrylamide and N-butoxymethylacrylamide and acrolein.

Additional comonomers can be added to the emulsion polymers. Included among such additional comonomers are monoethylenically unsaturated substituted aliphatic hydrocarbons such as vinyl chloride, and vinylidene chloride; aliphatic vinyl esters such as vinyl formate, vinyl propionate and vinyl butyrate.

Known and conventional protective colloids may be employed such as partially and fully hydrolyzed polyvinyl alcohols; cellulose ethers, e.g., hydroxymethyl cellulose, hydroxyethyl cellulose, starch and starch derivatives, carboxymethyl cellulose (CMC); the natural and synthetic gums, e.g., gum tragacanth and gum arabic; polyacrylic acid/acrylates, poly(vinylalcohol)co(vinyl amine) copolymers, and the like. Partially and fully hydrolyzed polyvinyl alcohols are preferred and are preferably employed from 1 to 10 percent based on the weight of the total monomer.

In accordance with the invention, the polymer includes a functionalized silane component which is capable of being incorporated into the polymer and adsorbing the protective colloid to provide stabilization to the polymer. Preferably, the silane component is of the formula:

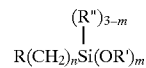

wherein R" is $C_1$–$C_5$ alkyl, R' is $C_1$–$C_5$ alkyl, R is SH, $CH_2$=CH—, $CH_2$=C($CH_3$)—C(O)O—, $CH_2$=CH—C(O)O—, and

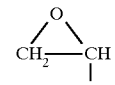

n is 1–10, and m is 2 or 3.

More preferably, the component is gamma mercapto propyl trimethoxy silane when R is SH, R' is $C_1$-alkyl, n is 3, and m is 3. The functionalized silane component may be present in the polymer in various amounts. As an example, the silane component may be present from 0.01 to 2 percent based on the weight of the total monomer. Preferably, the silane component is present in the amount of 0.5 percent based on the weight of the total monomer.

The polymer can include additives to improve its various physical and mechanical properties, the selection of which is readily apparent to one skilled in the art. For example, crosslinking agents can be included such as vinylic compounds (e.g., divinyl benzene); allyllic compounds (e.g., allyl methacrylate, diallyl maleate); multifunctional acrylates (e.g., di, tri and tetra (meth)acrylates); self crosslinking monomers such as N-methylol acrylamide, N-methylol methacrylamide and $C_1$–$C_4$ ethers of these monomers respectively (e.g., N-iso[butoxymethoxy] methacrylamide), acrylamido glycolic acid and its esters, and alkyl acrylamido glycolate alkyl ethers (e.g., methylacrylamido glycolate methyl ether). The crosslinking agents can be included in amounts of up to about 7 percent by weight, and preferably about 0.05 to 5 percent by weight. Additional monomers can be included to improve specific properties such as solvent resistance (e.g., nitrile-containing monomers such as acrylonitrile and methacrylonitrile) and adhesion and strength (e.g., use of acrylamide or methacrylamide).

An initiator which facilitates polymerization include, for example, materials such as persulfates, organic peroxides, peresters, and azo copounds such as azobis(isobutyronitrile) (AIBN). Peroxide initiators are preferred and include, for example, cumene hydroperoxide, 2,5-dimethylhexane-2,5-dihydroperoxide, dicumylperoxide, diisopropylbenzene hydroperoxide, tert butyl hydroperoxide, and the like. For the purposes of the invention, diisopropylbenzene hydroperoxide (DIP) is a preferred initiator. Preferably, the amount of initiator ranges from about 0.01 percent to about 2 percent based on the weight of the total monomer. More preferably, the initiator ranges from 0.1 percent to about 1 percent.

Reductants may be employed in the polymerization, and are typically employed in combination with the initiator as part of a redox system. Suitable reductants include sodium bisulfite, erythorbic acid, ascorbic acid, sodium thiosulfate, sodium formaldehyde sulfoxylate (SFS), and the like. A preferred redox system includes diisopropylbenzene hydroperoxide as a catalyst, SFS, and ferrous sulfate.

Conventional surfactants and emulsifying agents can also be employed and are preferably of the anionic and nonionic type. Polymerizable surfactants that can be incorporated into the polymer also can be used. The selection of these surfactants is apparent to anyone skilled in the art. Preferred nonionic surfactants are selected from the family of alkylphenoxypoly(ethyleneoxy)ethanols where the alkyl group typically varies from $C_7$–$C_{18}$ and the ethylene oxide units vary from 4–100 moles. Various preferred surfactants in this class include the ethoxylated octyl and nonyl phenols, and in particular ethoxylated nonyl phenols with a hydrophobic/lipophilic balance (HLB) of 15–19. Anionic surfactants can be selected from the broad class of sulfonates, sulfates, ethersulfates, sulfosuccinates, diphenyloxide disulfonates, and the like, and are readily apparent to anyone skilled in the art. The preferred anionic surfactant is selected from the diphenyloxide disulfatonate family. Preferably the total amount of surfactant present in the polymer ranges from 0.5 to 2.0 weight percent based on the total monomer.

Other additives which may be used include other natural and synthetic binders, fixing agents, wetting agents, plasticizers (e.g., diisodecyl phthalate), softeners, foam-inhibiting agents, froth aids, other crosslinking agents (e.g., melamine formaldehyde resin), flame retardants, dispersing agents (e.g., tetrasodium pyrophosphate), pH adjusting components (e.g., ammonium hydroxide), sequestering or chelating agents (e.g., ethylene diaminetetraacetic acid (EDTA) and other components. The selection of any of these additives is readily apparent to one skilled in the art.

The emulsion polymerization of the invention may be carried out by any known and suitable means, including batch and semi-continuous techniques. Subsequent to the emulsion polymerization taking place, a stripping step may be carried out to remove unreacted monomer and other volatile components which may be present. Any suitable technique may be used to carry out the stripping step including the use of steam (i.e., steam stripping) alone or in combination with a redox system (i.e., chemical stripping).

The emulsion polymers produced in accordance with the invention have several advantageous end uses. For example, the polymers may be utilized as redispersible powders for cement modification, adhesives for various substrates including but not limited to wood, vinyl, polyester, polyolefins, and cellulosics. The polymers may also be used in conjunction with garment and pad dyeing, printing, paper coating, masonry, and the like.

The present invention and its advantages over the prior art will be more fully understood and appreciated from the illustrative examples which follow. It is to be understood that the examples are for the purpose of illustration and are not intended as being limiting upon the scope of the invention. A person skilled in the applicable arts will appreciate from these examples that this invention can be embodied in many different forms other than as is specifically disclosed.

EXAMPLE 1

Batch Polymerization Process

Demineralized water (45–65 phm) is heated to between 176° F. and 185° F. ELVANOL 51-50® (3 phm) and 2 phm of ELVANOL 85-82® polyvinylalcohol are added to the water while mixing thoroughly until the polyvinyl alcohol is completely dissolved. Demineralized water (60–80 phm) is then mixed with 0.2 phm of dodecyldiphenyloxide disulfonate, 1 phm of nonylphenoxy poly(ethyleneoxy) ethanol (40 moles), 0.05 phm of EDTA (chelating agent), 0.1 phm of DIP, and 0.001 phm of ferrous sulfate (activator). All of the above ingredients including 40 phm of butadiene and 60 phm of methylmethacrylate are charged into a 1 gallon reactor and the temperature is raised to 150° F. Gamma mercapto propyl trimethoxy silane (1 phm) and 0.1 phm of SFS is then injected into the reactor to initiate polymerization. The rate of polymerization is controlled by initiator injections and/or by raising the reaction temperature. The reaction is carried out to a conversion greater than 98%. The pH of the mixture at the end of the reaction is adjusted to 6.5–7.0 with 28% ammonium hydroxide solution, and stripped to achieve a solids content of 53%. The polymer comprises 40% butadiene and 60% methylmethacrylate. The viscosity of the polymer is 1600 cps.

EXAMPLE 2

Semicontinuous Polymerization Process

Demineralized water (45–65 phm) is heated to between 176° F. and 185° F. ELVANOL 51-05® (3 phm) and 2 phm of ELVANOL 85-82® polyvinyl alcohols are added to the water while mixing thoroughly until the polyvinyl alcohol is completely dissolved. Demineralized water (15–35 phm) is then mixed with 0.5 phm of EDTA, 0.20 phm of dodecyldiphenyloxide disulfonate, 0.70 phm of nonylphenoxypoly (ethyleneoxy) ethanol (40 moles), 0.002 phm of ferrous sulfate, and 0.2 phm of DIP (initiator). The above ingredients are charged with the polyvinyl alcohol solution into a 1 gallon reactor. Butadiene (8 phm) and 12 phm of methylmethacrylate are then added to the mixture. The reactor ingredients are heated to 160° F. and 1 phm of gammamercaptopropyl-trimethoxysilane and 0.10 phm SFS are injected into the reactor. After maintaining the temperature at 160° F. for about 60–90 minutes, a mixture of 27 phm of butadiene, 53 phm of methylmethacrylate and (optionally) 0.3 phm of tertdodecylmercaptan (chain transfer agent), is fed continuously into the reactor over 5 hours. Simultaneously, a solution of 15 phm of demineralized water and 0.30 phm nonylphenoxypoly-(ethyleneoxy) ethanol (40 moles) is fed into the reactor over 3 hours, as is a mixture of 15 phm of demineralized water and 0.3 phm of SFS over 5.5 hours. The reaction is carried out to greater than 98% conversion. The pH is adjusted to about 6.5–7.0 with 28% ammonium hydroxide and the polymer is stripped to 53.4% solids. The polymer comprises 35% butadiene and 65% methylmethacrylate. The polymer has a viscosity of 1350 cps.

EXAMPLE 3

Semicontinuous Polymerization Process

The process is carried out according to Example 2, with the exception that the polymer composition is comprised of 35% butadiene, 64% methylmethacrylate and 1% methacrylic acid. The polymer is stripped to 52.4 percent solids and has a viscosity of 2260 cps.

EXAMPLE 4

Semicontinuous Polymerization Process

The process is carried out according to Example 2, with the exception that only 5 phm of ELVANOL 85-82® polyvinyl alcohol is employed. This is a fully hydrolyzed, medium-molecular weight polyvinyl alcohol. The polymer is stripped to 52.0 percent solids and has a viscosity of 2180 cps.

The foregoing is illustrative of the present invention and is not to be construed as limiting thereof. The invention is defined by the following claims, with equivalents of the claims to be included therein.

That which is claimed is:

1. A stabilized emulsion polymer comprising:
   from about 10 to about 70 weight percent of an aliphatic conjugated diene monomer;
   a protective colloid; and
   a functionalized silane component of the formula:

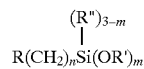

wherein R" is $C_1$ to $C_5$ alkyl, R' is $C_1$–$C_5$ alkyl, R is SH, $CH_2=CH—$, $CH_2=C(CH_3)—C(O)O—$, $CH_2=CH—C(O)O—$, and

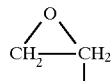

n is 1–10, and m is 2 or 3;
   wherein said functionalized silane component interacts with said protective colloid such that said functionalized silane component and said protective colloid stabilize said emulsion polymer.

2. The stabilized emulsion polymer of claim 1 wherein R is SH, R' is $C_1$-alkyl, n is 3, and m is 3.

3. The stabilized emulsion polymer according to claim 1 wherein the aliphatic conjugated diene monomer is 1,3-butadiene.

4. The stabilized emulsion polymer according to claim 1 comprising a non-aromatic mono- or dicarboxylic ester monomer.

5. The stabilized emulsion polymer according to claim 4 wherein the non-aromatic unsaturated mono- or dicarboxylic ester monomer is methyl methacrylate.

6. The stabilized emulsion polymer according to claim 1 comprising an aromatic unsaturated monomer.

7. The stabilized emulsion polymer according to claim 6 wherein the aromatic unsaturated monomer is selected from the group consisting of styrene, alphamethylstyrene, p-methyl styrene, ethylstyrene, tert-butyl styrene, monochlorostyrene, dichlorostyrene, fluorostyrene, and paramethoxystyrene.

8. The stabilized emulsion polymer of claim 1 further comprising a mono- or dicarboxylic acid monomer.

9. The stabilized emulsion polymer of claim 8 wherein the mono- or dicarboxylic acid monomer is acrylic acid.

10. The stabilized emulsion polymer of claim 1 comprising a nitrogen-containing monomer.

11. The stabilized emulsion polymer of claim 10 wherein the nitrogen-containing monomer is selected from the group consisting of acrylonitrile, methacrylonitrile, acrylamide, methacrylamide, N-methylolacrylamide, N-methoxymethylacrylamide, N-butoxymethylacrylamide and acrolein.

12. The stabilized emulsion polymer of claim 1 wherein said protective colloid is selected from the group consisting of polyvinyl alcohols, hydroxymethyl cellulose, hydroxyethyl cellulose, starch and starch derivatives, gum tragacanth, gum arabic, polyacrylic acid, carboxymethyl cellulose, poly(vinylalcohol)co(vinyl amine) copolymers, and dextrins.

13. The stabilized emulsion polymer of claim 12 wherein said protective colloid is a polyvinyl alcohol.

14. The stabilized emulsion polymer of claim 1 further comprising from 0.5 to 2.0 weight percent of a surfactant.

15. An emulsion polymer formed from an aliphatic conjugated diene monomer and said polymer being stabilized by a protective colloid and a functionalized silane component capable of being incorporated into the polymer and capable of adsorbing the protective colloid to provide stabilization to the polymer wherein the functionalized silane component is of the formula:

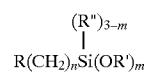

wherein R" $C_1$–$C_5$ alkyl, R' is $C_1$–$C_5$ alkyl, R is SH, $CH_2=CH—$, $CH_2=C(CH_3)—C(O)O—$, $CH_2=CH—C(O)O—$, and

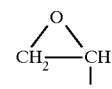

n is 1–10, and m is 2 or 3.

16. The emulsion polymer of claim 15 wherein R is SH, R' is $C_1$-alkyl, n is 3, and m is 3.

17. The emulsion polymer according to claim 15 wherein the aliphatic conjugated diene monomer is 1,3-butadiene.

18. The emulsion polymer according to claim 15 comprising a non-aromatic mono- or dicarboxylic ester monomer.

19. The emulsion polymer according to claim 18 wherein the non-aromatic unsaturated mono- or dicarboxylic ester monomer is methyl methacrylate.

20. The emulsion polymer according to claim 15 comprising an aromatic unsaturated monomer.

21. The emulsion polymer according to claim 20 wherein the aromatic unsaturated monomer is selected from the group consisting of styrene, alphamethylstyrene, p-methyl styrene, ethylstyrene, tert-butyl styrene, monochlorostyrene, dichlorostyrene, fluorostyrene, and paramethoxystyrene.

22. The emulsion polymer of claim 15 further comprising a mono- or dicarboxylic acid monomer.

23. The emulsion polymer of claim 22 wherein the mono- or dicarboxylic acid monomer is acrylic acid.

24. The emulsion polymer of claim 15 comprising a nitrogen-containing monomer.

25. The emulsion polymer of claim 24 wherein the nitrogen-containing monomer is selected from the group consisting of acrylonitrile, methacrylonitrile, acrylamide, methacrylamide, N-methylolacrylamide, N-methoxymethylacrylamide, N-butoxymethylacrylamide and acrolein.

26. The emulsion polymer of claim 15 wherein the protective colloid is selected from the group consisting of polyvinyl alcohols, hydroxymethyl cellulose, hydroxyethyl cellulose, starch and starch derivatives, gum tragacanth, gum arabic, polyacrylic acid, carboxymethyl cellulose, poly(vinylalcohol)co(vinyl amine) copolymers, and dextrins.

27. The emulsion polymer of claim 26 wherein the protective colloid is a polyvinyl alcohol.

28. The emulsion polymer of claim 15 further comprising from 0.5 to 2.0 weight percent of a surfactant.

29. A process for making an emulsion polymer comprising:
polymerizing an aqueous reaction mixture of from about 10 to about 70 percent by weight of an aliphatic conjugated diene monomer, a protective colloid, and a functionalized silane component of the formula:

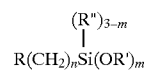

wherein R" is $C_1$ to $C_5$ alkyl, R' is $C_1$–$C_5$ alkyl, R is SH, $CH_2$=CH—, $CH_2$=C($CH_3$)—C(O)O—, $CH_2$=CH—C(O)O—, and

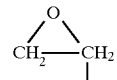

n is 1–10, and m is 2 or 3, to form an emulsion polymer, wherein the functionalized silane component interacts with the protective colloid during polymerization such that the functionalized silane component and the protective colloid stabilize the emulsion polymer.

30. The method according to claim 29 wherein R is SH, R' is $C_1$-alkyl, n is 3, and m is 3.

31. The method according to claim 29 wherein the aliphatic conjugated diene monomer is 1,3-butadiene.

32. The method according to claim 29 comprising a non-aromatic mono- or dicarboxylic ester monomer.

33. The method according to claim 32 wherein the non-aromatic unsaturated mono- or dicarboxylic ester monomer is methyl methacrylate.

* * * * *

UNITED STATES PATENT AND TRADEMARK OFFICE
CERTIFICATE OF CORRECTION

PATENT NO. : 5,830,934
DATED : November 3, 1998
INVENTOR(S) : Venkataram Krishnan It is certified that error appears in the above-identified patent and that said Letters Patent is hereby corrected as shown below:

Column 8, claim 15, lines 34-35,

"the polymer wherein the functionalized silane component is of the formula:" should read –the polymer, said emulsion polymer comprising from about 10 to about 70 weight percent of said aliphatic conjugated diene monomer, and wherein said functionalized silane component is of the formula:--.

Signed and Sealed this

Eighth Day of June, 1999

Attest:

Q. TODD DICKINSON

*Attesting Officer*    *Acting Commissioner of Patents and Trademarks*